March 24, 1936.  N. C. STOREY  2,034,780
ROTARY TILLING MACHINERY
Filed Oct. 9, 1933   3 Sheets-Sheet 2

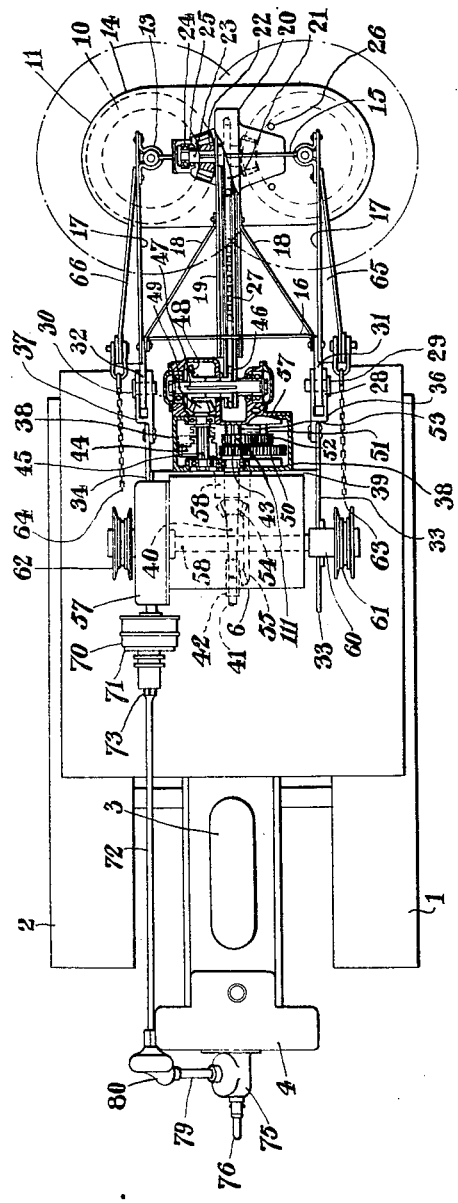

INVENTOR.
NORMAN CHOATE STOREY.
ATTORNEY.

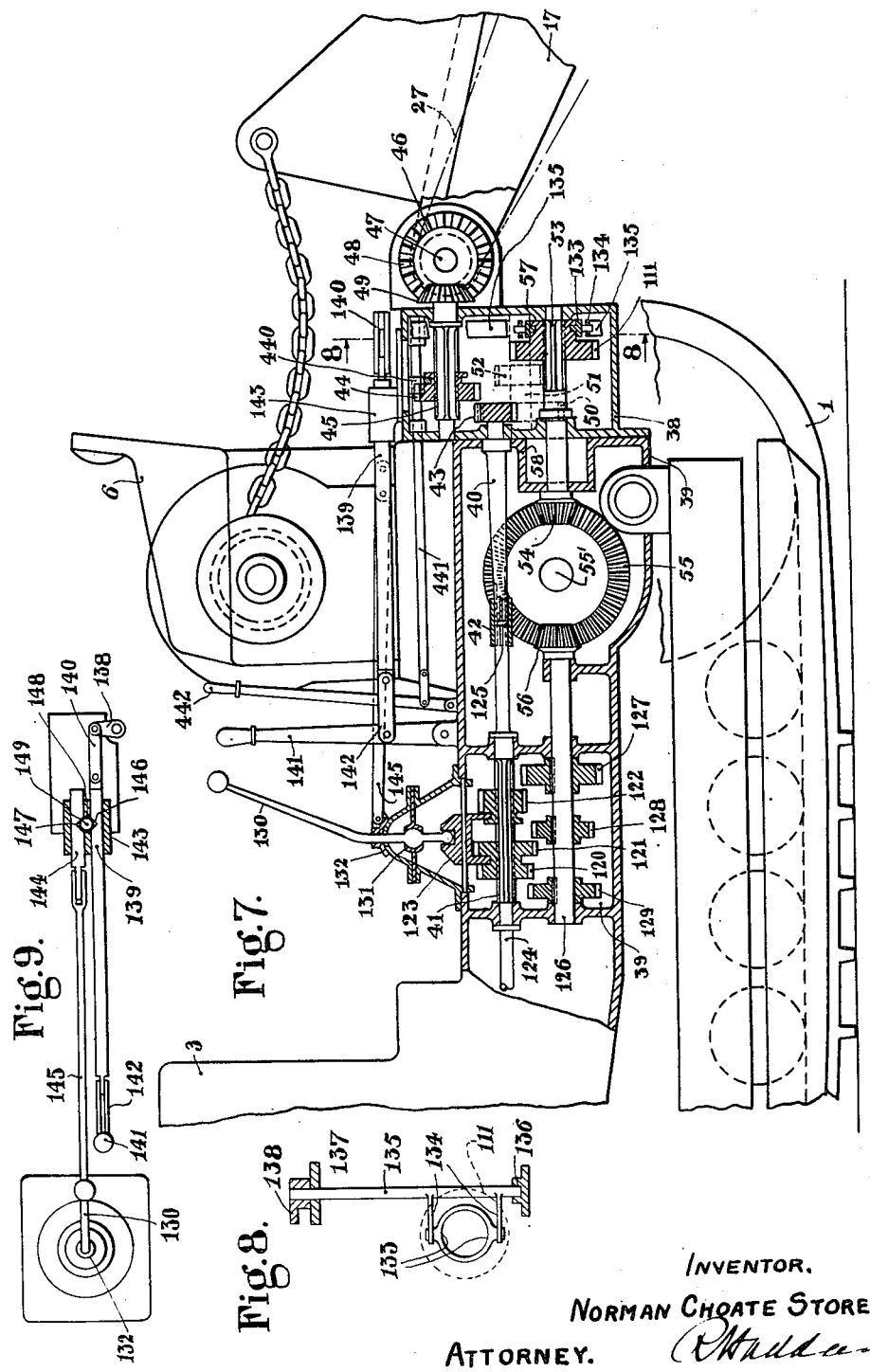

Patented Mar. 24, 1936

2,034,780

UNITED STATES PATENT OFFICE 2,034,780

ROTARY TILLING MACHINERY

Norman Choate Storey, Hunslet, Leeds, England

Application October 9, 1933, Serial No. 692,835
In Great Britain February 8, 1933

13 Claims. (Cl. 97—43)

This invention relates to rotary tilling machinery in which the earth working implements are mounted and driven about an axis slightly inclined to the vertical.

The object of the invention is to provide a rotary tilling device of the above mentioned type in the form of an attachment that can be mounted on a tractor which, with its component parts, makes the combination a self-contained unit.

The advantages of the invention are:—

The simplicity and few parts necessary to produce this attachment enable it to be produced at a cost within reach of most farmers having a suitable tractor and having need of the type of tillage produced by this machine. The compactness of this particular arrangement enables the smallest plots to be economically tilled regardless of shape. Corners and headlands can be worked to their limits.

The application of this attachment does not alter in the least any of the regular features of the tractor. By simply removing the driving and lifting chains and disconnecting the tiller frame hinge pins hereinafter referred to the tractor is ready for any conventional job.

On the accompanying drawings Fig. 1 is an outlined plan of a crawler type of tractor with my rotary tilling attachment and component members shown partly in full and partly in section added thereto.

Fig. 2 is a side elevation of the tractor with the tilling attachment in working position with the earth working implements shown in the ground. This view shows the lifting clutch and holding brake in section and the worm and gear members of the hoist in dotted lines.

Fig. 7 is a partial side elevation of the tractor and tilling attachment showing details of the tractor's gear box and the auxiliary gear box, details of the implement hoist having been omitted.

Fig. 8 is a detail view of part of the gear shifting means, substantially in cross section on line 8—8 of Fig. 7.

Fig. 9 is a plan view of the connections between the normal change speed lever and the gear shifting means of the auxiliary gear box.

Figure 3:
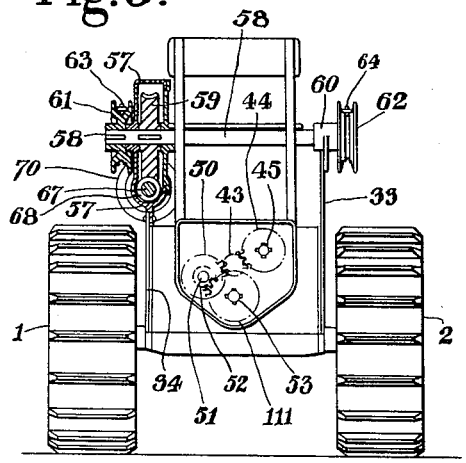
Fig. 3 is a rear elevation of the tractor showing the worm gear hoist and chain winding drum in section and an outline of the reduction and tiller driving gears showing which gears mesh with each other, the rear of the gear casing being omitted.
Figure 4:
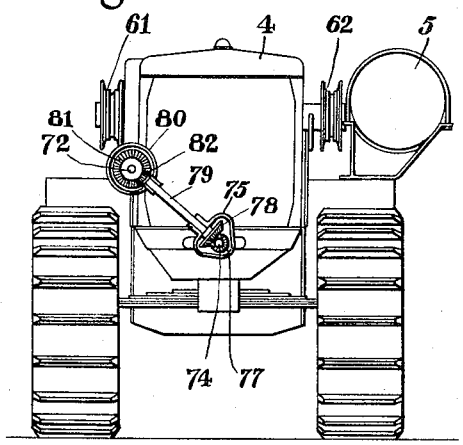
Fig. 4 is a front view of the tractor showing the arrangement of the gear drive from the front of the tractor engine for driving the worm hoist. It also shows the fuel tank which has been omitted from the other views.

In the embodiment of the invention illustrated, the tractor is of the crawler type carried on crawler wheels 1 and 2. 3 represents the motor, 4 the radiator, 5 the fuel tank and 6 the driver's seat. As the tractor's controls and other details have no bearing on my invention these have been omitted. The earth tilling part of my invention includes the tynes 7 and shares or cutters 8 which are carried by the tiller frame.

The tiller frame comprises two side plates 17 which are tied together by cross members 15 and 16 and diagonal braces 18, the latter being secured at their inner ends to a chain alley 19. Attached to the rear of the tiller frame is a plate 14 which carries two bearings 13 for the tiller spindles 12 said bearings being also secured to the side plates 17 and the transverse member 15.

The plate 14 carries a housing 20 in which is journaled a rotor driving shaft 23 supported in bearings 24 secured to the plate 14 by bolts 26 and provided with housings 25. A pair of bevel gears 22 are secured to said shaft 23 and between them is mounted a sprocket 21 for driving the shaft. The bevel gears 22 mesh with implement driving gears 10 which are mounted on the tiller spindles 12 and drive the earth working implements 7 and 8 which are mounted on an implement support 9.

The hinge connection for attachment of the tiller supporting frame to the tractor comprises two plates 33 and 34 which are secured to the side of the tractor's gear box by bolts 35. These plates extend back and carry tiller hinge jaws 36 and 37 in which lugs 31 and 32 secured to the side plate 17 are pivotally connected by hinge pins 29 and 30.

The hinge connection for attachment of the tiller supporting frame to the tractor may be provided with eccentric means for tightening the sprocket driving chain 27 as described in my earlier United States Patent No. 1,743,836.

The tractor's gear box 39 carries the main driving shaft 41 which is provided with splines to driver gears 120, 121, 122, which are mounted with a sliding fit and provided with suitable gear shifters 123 hereinafter referred to. The shaft 41 is carried in suitable bearings and has a forward extension 124 which connects to the engine clutch and the rear end is provided with a splined end 125 which connects to the driving shaft 40 of the auxiliary transmission, forming a continuation of the main driving shaft, to which it is connected by any suitable connection, here shown as a sleeve 42 engaging splines on the ends of the two shafts. The tractor's secondary driving shaft 126 carries a bevel drive pinion 56 and driving gears 127, 128, 129 keyed on in their respective places. The bevel gear 55 mounted on a transverse driven shaft 55' provides a drive to the wheels on both sides of the tractor and is driven by the bevel drive pinion 56.

As tractors are not equipped with either a suitable power take-off to drive the attachment or a suitable slow driving speed to meet the requirements of the tillers, an auxiliary transmission has been provided to serve both purposes. This transmission is housed in a gearbox 38 and attached to the rear of the tractor's gear box 39.

This auxiliary transmission is operated through the continuation driving shaft 40. The rear end of the driving shaft 40 carries a driving pinion 43 which is a source of drive for both the tillers and the slow track drive. Above a horizontal centre line through the driving pinion 43 and to one side of a vertical centre line is a transmission power shaft 45, which is splined for a slip fit in a gear wheel 44 adapted to be meshed with the driving pinion 43 and provided with a suitable gear shift 440 operated by a lever 441 and hand lever 442. The shaft 45 is carried in bearings in the auxiliary gear case and carries at its rear end a bevel pinion 49 which meshes with a bevel gear 48 carried on a transverse shaft 47 mounted in suitable bearings in the gear case head 57. The shaft 47 has keyed thereon a sprocket 46 from which power is transmitted back to the tiller sprocket 21 through the chain 27.

To effect the drive from the driving pinion 43 to the tillers, the gear wheel 44 is shifted on its splined shaft 45 by the gear shifter 440, 441, 442 and meshed with the driving pinion 43, thus the driving sprocket 46 is driven through shaft 47, bevel gear 48, and bevel pinion 49. From the driving sprocket 46 the power is transmitted back to the tiller sprocket 21 through the chain 27 driving the shaft 23, bevel gears 22 and the inner gears 10.

Below a horizontal centre line through the driving pinion 43 and to one side of a vertical centre line is an intermediate shaft 51 which carries a pinion 50 in mesh with the driving pinion 43. On the intermediate shaft 51 and to the rear of its pinion 50 is a pinion 52. A splined shaft 53 carried at its rear in bearings located in the gearcase head 57 and at its forward end in a bearing supported in a projecting part 58 of the gearbox 39, has its axial centre line in line with the axial centre line of the tractor's secondary driving shaft 126 and carries on its forward end a bevel pinion 54 which is of the same dimensions as those of the bevel drive pinion 56 and also meshes with the wheel drive gear 55. Mounted with a sliding fit on said splined shaft 53 and provided with a suitable gear shift hereinafter described, is a gear 111 adapted to be meshed with the pinion 52.

In Fig. 7, 123 is a conventional gear shift connecting with the tractor gears 120, 121, 122 and is actuated by a shift lever 130 which is supported in a socket bearing 131. 132 is a dust cover and is movable with the lever 130. Sliding gear 111 of the auxiliary transmission is actuated by means of a shifter ring 133 and yoke 134 and vertical shaft 135 (Fig. 8). Shaft 135 is carried in a foot bearing 136 at the bottom and is supported at the top by passing through the case at 137 and is rotated by means of a lever 138 (Figs. 8 and 9) securely fastened on the upper end. A plunger 139 is connected to the lever 138 by links 140 and to a hand lever 141 by links 142 and is carried in a housing 143. Parallel to the plunger 139 and carried in the same housing is a plunger 144 which is connected to the dust cover 132 by means of a rod 145. Plungers 139 and 144 are provided with V grooves 146 and 147 which are directly opposite each other when gears 120, 121, 122 and gear 111 are in their neutral positions. In a hole 148 through the housing 143 and between the V grooves is a ball 149. The diameter of the ball 149 being more than the distance between the two plungers it is obvious that when one of the plungers is moved, the ball is pushed into the groove of the other thus locking it. That is, when the lever 130 is pushed either forward or rearward, the ball is forced into the groove of the plunger 139 thus locking it and preventing the shifting of gear 111 or when gear 111 has been put into mesh with gear 52 by movement of lever 141, plunger 144 would be likewise locked by the ball 149.

The shift for the gear 111 on the splined shaft 53 is thus interlocked with the tractor's gear shift to prevent the bevel pinion 56 and the bevel pinion 54 of the auxiliary transmission from being engaged at the same time.

The manner in which the tractor transmission and the auxiliary transmission work is as follows:—

Power from the tractor motor is transmitted to the main driving shaft 41 through the clutch end 124 of said shaft and to apply the desired speed to the tractor wheels, one pair of gears 120—129, 121—128 or 122—127 is engaged, driving the bevel gear 55 on the wheel axle or driven shaft 55' by the bevel pinion 56 on the tractor's secondary driving shaft 126. The bevel gear on the wheel axle and its driving pinion change the line of drive from a longitudinal direction to a transverse for the purpose of connecting directly or indirectly with the driving wheels on both sides of the tractor. The gear 55 on the wheel axle may be a crown wheel for a differential and form the final driving member or it may be secured to a shaft and drive the wheels through other gears or clutches as is common practice.

With the type of earth working tools shown, it is desirable to drive the tractor at a much lower speed than is possible with the conventional main transmission. The type of tools shown cannot be worked to best advantage when driven in the lowest speed possible with the usual transmission. Therefore, when the tractor is to be used to operate such tools, the main transmission is placed in neutral and the auxiliary transmission is put into operation, by shifting the handles 130 and 141, respectively. Then the driven shaft or wheel axle 55' is operated from the main driving shaft through its continuation or extension 40, pinions 43 and 50, shaft 51, pinion 52, gear 111, shaft 53, and pinion 54 engaging with the gear 55. The tools may be put into operation by operating the handle 442 as previously described, the tools being operated through a part of the auxiliary transmission, but without affecting the drive through that transmission to the driven shaft 55'.

To raise and lower the tilling implements a worm gear hoisting device is provided. A worm gear case 57 is supported and carried on the top of plate 34 and carries a shaft 58, on which is keyed a worm gear 59. Shaft 58 is carried on the other side of the tractor in bearing 60 which is supported on plate 33. On the ends of the shaft 58 are chain drums 61 and 62. Fastened to the chain drums are hoisting chains 63 and 64 which connect to offset plates 65 and 66, which are fastened to the tiller side frames 17. A worm shaft 67 which carries a worm 68 passes through a suitable gland 69 and is keyed into the female part 70 of a hoisting clutch. The male part of the hoisting clutch 71 is rotarily mounted on the forward end of the worm shaft 67 and is driven on its forward end by the splined end 72 of driving shaft 73.

Figure 5:
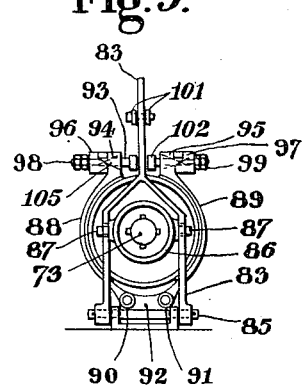
Figs. 5 and 6 show in elevation at right angles to one another an arrangement for operating the clutch and brake on the implement hoist.
Figure 6:
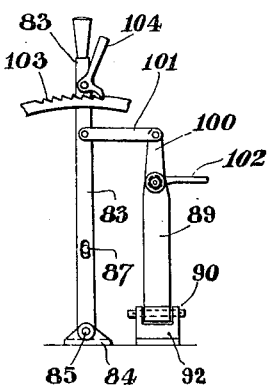

A special driving shaft 74 is fitted to the forward end of the tractor engine and drives gears in a gearbox 75, and is provided with an extension for the usual starting handle 76. On this shaft 74 is keyed a bevel pinion 77 which drives a bevel gear 78 on a counter-shaft 79. On the side of the radiator and in line with the driving shaft 72 is a gearbox 80, which houses a bevel gear 81 mounted on the driving shaft 72, and a bevel pinion 82 which is mounted on the counter-shaft 79 and meshes with said bevel gear 81 and thus completes the drive from the front of the tractor engine to the hoisting clutch. To actuate the cone 71 of the clutch, an operating lever 83 (see Figs. 5 and 6) is provided, and is hinged at the foot by bracket 84 on shaft 85. Cone 71 is brought in clutching contact with clutch 70 by means of a shifter yoke 86, having its trunnion bearings 87 in the operating lever 83. On the outer rim of clutch 70 holding brake shoes 88 and 89 are provided, which are held at their lower ends by pins 90 and 91 to a bracket 92. To actuate these brake shoes and apply the brake the round part of a shaft 93 passes through the upper ends of the brake shoes at 94 and 95, and squared ends 105 fit into cammed pieces 96 and 97, which are held by lock nuts 98 and 99. The upper ends of the brake shoes at 94 and 95 have cams of opposite hands to match the above mentioned cammed pieces 96 and 97, so that a rotation of the shaft 93 in one direction will rotate the cammed pieces 96 and 97 and thus force the brake shoes 88 and 89, against the clutch 70. To rotate the shaft 93 and set the holding brake when the cone 71 is in a forward position, a lever 100 is fastened by some suitable means in the centre of the shaft 93 and attached at its upper end to the operating lever 83, by straps 101. A tension rod 102 is connected between the shaft 93 and worm gear case 57 to hold the brake against the pull set up by the operating lever 83 while applying the brake. To keep the brake set with the implements in a hoisted position a rack 103 and hand operated pawl 104 are provided.

A depth runner 106 with a flat bottom is provided to hold the earth working tools to an even depth while the hoisting chains are slack. The depth runner is secured to the bottom of a vertical bar 107 which has a knife edge at 108 and is connected to the tiller frame by a hinge 109 and pin 110.

From the above it will be seen that I have provided a novel apparatus in which the operator may obtain either the standard speeds through the main transmission, or a much lower speed which will enable him to use tools of the type shown or other tools which operate best when the tractor is moving at a speed lower than can be obtained by the ordinary standard transmission. The two transmissions, main and auxiliary, are arranged "in parallel" under the same sense that that expression is used in the electrical arts in describing the arrangement of electrical circuits. Similarly, it will be noted that the auxiliary transmission forms two independent driving means, one for the driven shaft 55' and the other for the tool-operating shaft 47.

While I have shown the invention as embodied in a specific form, it is to be understood that various changes in details may be made without departing from the scope of the invention, as defined by the appended claims.

What I claim as my invention and desire to secure by Letters Patent of the United States is:—

1. The combination with a tractor having a motor, a shaft driven by said motor, drive wheels and a main change-speed transmission between said motor and said drive wheels, of an attachment comprising a frame having detachable hinged connection to said tractor to swing in a vertical plane, implement carriers rotarily mounted on said auxiliary frame in vertically extending bearings, earth working implements mounted on said implement carriers, driving means for said implement carriers, an auxiliary transmission comprising means by which said implement carriers are driven from said motor shaft, and means for driving the drive wheels from the motor shaft through said auxiliary transmission when said main transmission is in neutral.

2. The combination with a tractor having a motor, a shaft driven by said motor, drive wheels and a main-change-speed transmission between said motor and said drive wheels, of an attachment comprising a frame having detachable hinged connection to said tractor to swing in a vertical plane, implement carriers rotarily mounted on said auxiliary frame in vertically extending bearings, earth working implements mounted on said implement carriers, driving means for said implement carriers, an auxiliary transmission comprising reduction gearing through which said implement carriers are driven from said motor shaft, and means for driving the drive wheels from the motor shaft through said auxiliary reduction when said main transmission is in neutral.

3. The combination with a tractor having a motor, a shaft driven by said motor, drive wheels and a main change-speed transmission between said motor and said drive wheels, of an attachment comprising a frame having detachable hinged connection to said tractor to swing in a vertical plane, implement carriers rotarily mounted on said auxiliary frame in vertically extending bearings, earth working implements mounted on said implement carriers, driving means for said implement carriers an auxiliary transmission comprising means by which said implement carriers are driven from said motor shaft, and means for driving the drive wheels from the motor shaft through said auxiliary transmission when said main transmission is in neutral together with a hoisting gear for said frame and means for giving driving power to said hoisting gear from the tractor's motor.

4. The combination with a tractor having a motor, a shaft driven by said motor, drive wheels and a main change-speed between said motor and said drive wheels, of an attachment comprising a frame having detachable hinged connection to said tractor to swing in a vertical plane, implement carriers rotarily mounted on said auxiliary frame in vertically extending bearings, earth working implements mounted on said implement carriers, driving means for said implement carriers, an auxiliary transmission comprising reduction gearing through which said implement carriers are driven from said motor shaft, and means for driving the drive wheels from the motor shaft through said auxiliary reduction when said main transmission is in neutral, together with a hoisting gear for said frame and means for giving driving power to said hoisting gear from the tractor's motor.

5. The combination with a tractor having a motor, a shaft driven by said motor, drive wheels and a main change-speed between said motor and said drive wheels, of an attachment comprising a frame having detachable hinged connection to said tractor to swing in a vertical plane, implement carriers rotarily mounted on said auxiliary frame in vertically extending bearings, earth working implements mounted on said implement carriers, driving means for said implement carriers, an auxiliary transmission through which said implement carriers are driven from said motor shaft, means for driving the drive wheels from the motor shaft through said auxiliary transmission when said main transmission is in neutral together with a hoisting gear for said frame and means comprising a transmission from the tractor's motor shaft to said hoisting gear and a clutch in said last mentioned transmission.

6. The combination with a tractor having a motor, a shaft driven by said motor, drive wheels and a main change-speed between said motor and said drive wheels, of an attachment comprising a frame having detachable hinged connection to said tractor to swing in a vertical plane, implement carriers rotarily mounted on said auxiliary frame in vertically extending bearings, earth working implements mounted on said implement carriers, driving means for said implement carriers and an auxiliary transmission comprising reduction gearing through which said implement carriers are driven from said motor shaft, and means for driving the drive wheels from the motor shaft through said auxiliary reduction when said main transmission is in neutral together with a hoisting gear for said frame and means comprising a transmission from the tractor's motor shaft to said hoisting gear and a clutch in said last mentioned transmission.

7. In combination, a tractor having a driving shaft and a driven shaft to propel the tractor, a main change speed transmission adapted to connect said shafts, an auxiliary change speed transmission independent of and in parallel with said main transmission and adapted to drive said driven shaft from the driving shaft at a speed lower than can be done by said main transmission, a frame detachably hinged to said tractor about a horizontally extending axis, earth working tools mounted on said frame to rotate about vertically extending axes, means to raise and lower said frame on its hinge, means to rotate said tools about their axes from said main driving shaft but at a reduced speed, and means to render either one of said transmissions operative.

8. In combination, a tractor having a driving shaft and a driven shaft to propel the tractor, a main change speed transmission adapted to connect said shafts, an auxiliary change speed transmission independent of and in parallel with said main transmission and adapted to drive said driven shaft from the driving shaft at a speed lower than can be done by said main transmission, a frame detachably hinged to said tractor about a horizontally extending axis, earth working tools mounted on said frame to rotate about vertically extending axes, means to raise and lower said frame on its hinge, means to rotate said tools about their axes from said main driving shaft but at a reduced speed, means to render either one of said transmissions operative, and means to prevent operation of one transmission while the other is operative.

9. In combination, a tractor having a driving shaft and a driven shaft to propel the tractor, a main change speed transmission adapted to connect said shafts, an auxiliary change speed transmission independent of and in parallel with said main transmission and adapted to drive said driven shaft from the driving shaft at a speed lower than can be done by said main transmission, a casing supporting said auxiliary transmission, a frame hinged to the rear of said casing about a horizontally extending axis, earth working tools mounted on said frame to rotate about vertically extending axes, means to detachably secure said casing to the tractor with said transmission in position to operatively connect said driving and driven shafts, means to raise and lower said frame on its hinge, means to rotate said tools about their axes from said main driving shaft but at a reduced speed, and means to render either one of said transmissions operative.

10. In combination, a tractor having a driving shaft and a driven shaft to propel the tractor, a main change speed transmission adapted to connect said shafts, an auxiliary change speed transmission independent of and in parallel with said main transmission and adapted to drive said driven shaft from the driving shaft at a speed lower than can be done by said main transmission, a frame detachably hinged to said tractor about a horizontally extending axis, earth working tools mounted on said frame to rotate about vertically extending axes, means to raise and lower said frame on its hinge, means to rotate said tools about their axes from said main driving shaft at a reduced speed through part of said auxiliary transmission, and means to render either one of said transmissions operative.

11. In combination, a tractor having a driving shaft and a driven shaft to propel the tractor, a main change speed transmission adapted to connect said shafts, an auxiliary change speed transmission independent of and in parallel with said main transmission and adapted to drive said driven shaft from the driving shaft at a speed lower than can be done by said main transmission, a frame detachably hinged to said tractor about a horizontally extending axis, earth working tools mounted on said frame to rotate about vertically extending axes, means to raise and lower said frame on its hinge, means to rotate said tools about their axes from said main driving shaft at a reduced speed through part of said auxiliary transmission, means to render either one of said transmissions operative, and means to prevent operation of one transmission while the other is operative.

12. In combination, a tractor having a driving shaft and a driven shaft to propel the tractor, a main change speed transmission adapted to connect said shafts, an auxiliary change speed transmission independent of and in parallel with said main transmission and adapted to drive said driven shaft from the driving shaft at a speed lower than can be done by said main transmission, a frame detachably hinged to said tractor about a horizontally extending axis, earth working tools mounted on said frame to rotate about vertically extending axes, means to raise and lower said frame on its hinge, means to rotate said tools about their axes from said main driving shaft at a reduced speed through part of said auxiliary transmission and independently of the driving connection between the driving shaft and the driven shaft through said auxiliary transmission, and means to render either one of said transmissions operative.

13. In combination, a tractor having a motor and a frame hinged thereto on a horizontally extending axis adjacent the rear end thereof, earth working tools mounted on said frame, means to operate said tools from the motor of the tractor, means to raise and lower said frame on its hinge comprising a shaft, a clutch adapted to operatively connect said shaft to the motor of the tractor, means to operate said clutch thus to connect the shaft to the motor, a brake adapted to operate on said shaft, and a connection between said brake and the clutch operating means and adapted to cause the brake to be applied to the shaft when the clutch is disengaged.

NORMAN CHOATE STOREY.